March 27, 1934. G. M. HARTSOCK 1,952,434
TRANSMISSION MECHANISM
Filed April 20, 1931 2 Sheets-Sheet 2
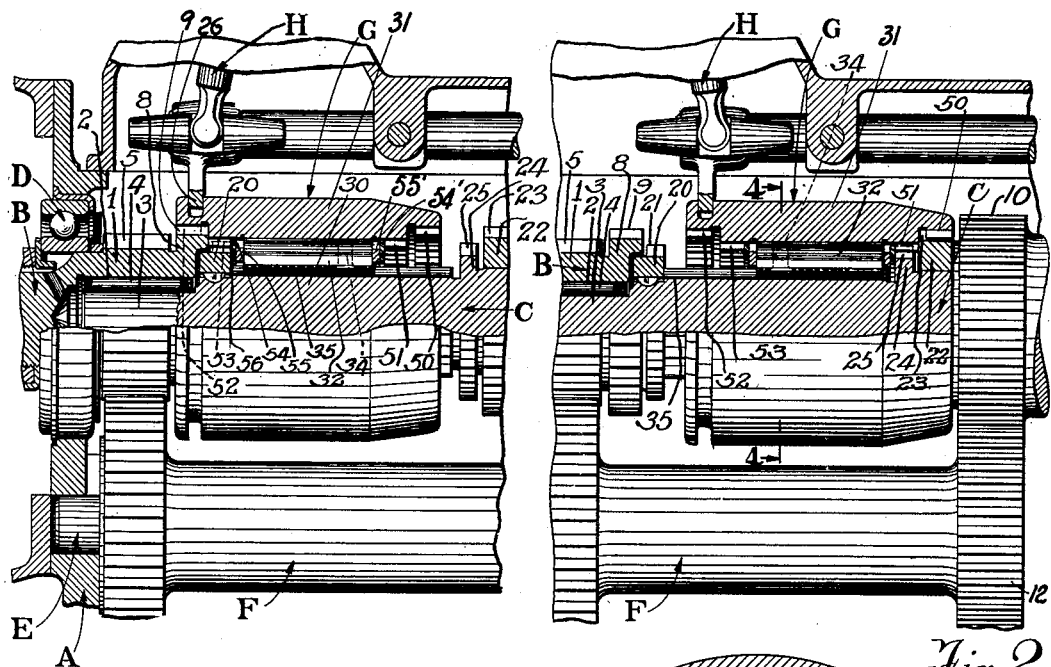
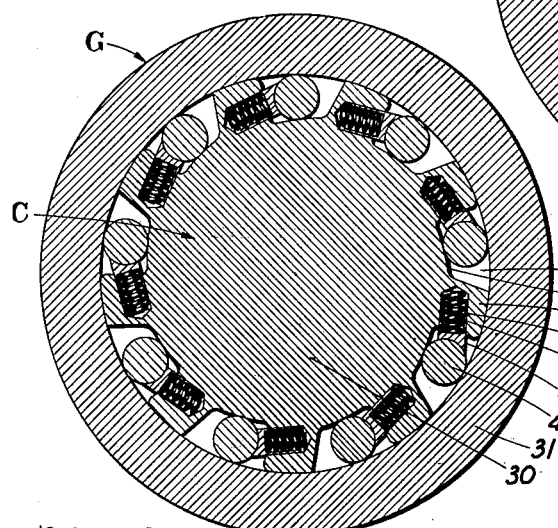
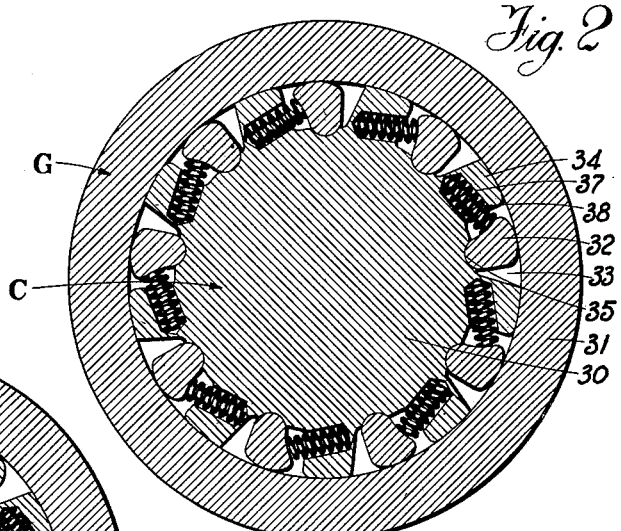
INVENTOR.
Guy M. Hartsock
BY P. M. Pomeroy
ATTORNEYS.

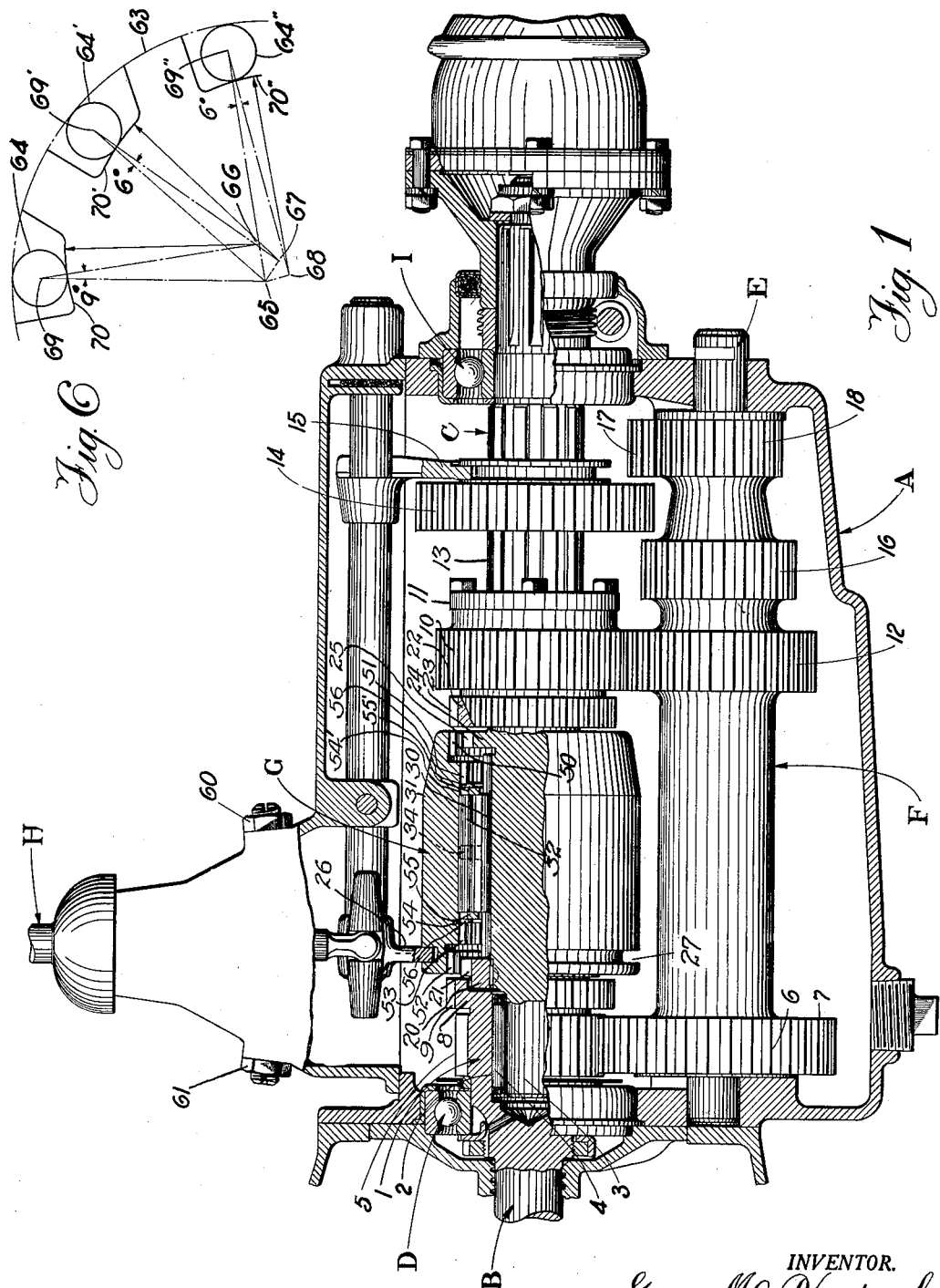
March 27, 1934.  G. M. HARTSOCK  1,952,434
TRANSMISSION MECHANISM
Filed April 20, 1931    2 Sheets-Sheet 1

Patented Mar. 27, 1934

1,952,434

UNITED STATES PATENT OFFICE 1,952,434

TRANSMISSION MECHANISM

Guy M. Hartsock, Detroit, Mich., assignor, by mesne assignments, to Free Wheeling Patents Corporation, South Bend, Ind., a corporation of Delaware Application April 20, 1931, Serial No. 531,434

18 Claims. (Cl. 192—48)

This invention relates to improvements in variable speed transmission mechanisms adapted particularly for use in automotive vehicles, although not limited to such use, and has for its principal object to selectively provide a one-way or a two-way drive, the wedging elements for providing the one-way or free wheeling drive being shiftable with the control member.

Free wheeling in a motor vehicle occurs when the vehicle is permitted to drive the driven shaft of its transmission at a higher speed than the speed of rotation of the engine shaft while the driven shaft of the transmission is coupled in driving relation to the engine shaft. A great many advantages flow from the provision of free wheeling in motor vehicle transmission, probably the most outstanding of which are: reduced fuel and oil consumption; less wear on the engine and transmission, increased driving safety and greater ease of vehicle control, especially in that element of vehicle control wherein the transmission gears are shifted in order to select the proper engine, and vehicle speed ratio.

A further object of the invention is to provide a transmission of the above mentioned type wherein overrunning or free wheeling may be permitted or prevented at the will of the operator.

A still further object of the invention is to provide a novel form of overrunning clutch structure in a variable speed transmission mechanism to provide free wheeling at certain speed settings of the mechanism.

Other objects and advantages of the invention will be apparent during the course of the following description.

In the accompanying drawings forming a part of this specification and in which like numerals are employed to designate like parts throughout the several views;

Figure 1 is a vertical longitudinal sectional view through a variable speed transmission mechanism wherein an overrunning or free wheeling device is provided in connection with certain forward drive means.

Figure 2 is a fragmentary longitudinal vertical sectional view on an enlarged scale and shows in detail the overrunning or free wheeling mechanism set for second speed positive drive.

Figure 3 is a fragmentary longitudinal vertical sectional view on an enlarged scale and shows in detail the overrunning or free wheeling mechanism set for third speed positive drive.

Figure 4 is a transverse sectional view taken on the line 4—4 of Figure 2.

Figure 5 is a view similar to Figure 4, but showing a somewhat modified form of the device.

Figure 6 is a diagrammatic illustration showing the formation of the cam surfaces in the device shown in Figure 5.

For the purpose of enabling those skilled in the art to arrive at a rapid understanding of the construction and mode of operation of the two different forms of transmission embodied in this invention, the same will be briefly described.

The transmission comprises a drive shaft B, a driven or transmission shaft C, a countershaft E and a sleeve F mounted upon the countershaft. The drive shaft B and the driven shaft C are supported in axial alignment with each other by means of the anti-friction bearings D and I in opposite ends of the casing A. The shafts B and C and the sleeve F carry gears of different diameters to provide for variable speed ratios between the motor and the vehicle. The drive shaft B carries upon its end which projects into the transmission housing, a gear 1 within which is provided a concentric recess or pocket 2 which receives the reduced end portion 3 of the driven shaft C. Mounted between the reduced end portion 3 and the inner surface of the recess 2, are anti-friction rollers 4. The gear 1 has formed peripherally thereon a set of gear teeth 5 and rearwardly thereof an enlarged annular flange 8 about the periphery of which are formed a set of clutch teeth 9. The gear teeth 5 of the gear 1 are constantly in mesh with the teeth 6 of a gear 7 formed on the sleeve F. Gears 12, 16 and 18 are also formed on the sleeve F, and are of different diameters to provide for variable speed ratios between the drive shaft B and the driven shaft C. The driven shaft C is provided for a part of its length with splines 13, and carries upon this splined portion, a gear 14 adapted to be moved by means of the shifter fork 15 into mesh with the gear 16, or with an idler pinion 17 mounted upon the housing A, and constantly in mesh with the gear 18, to provide first and reverse speeds respectively in the usual manner.

A gear 10 is rotatably mounted upon the driven shaft C forwardly of the splined portion thereof and is restrained from axial movement by the member 11 and other elements not shown. The gear teeth of the gear 10 are constantly in mesh with the teeth of the gear 12 formed on the sleeve F, and forwardly of the gear teeth, the gear 10 is provided with an annular extension 22 which carries peripherally thereof, a set of clutch teeth 23 for a purpose to be later described.

Immediately forward of the gear 10, the driven shaft C carries an integral flange or radial extension 24 which has formed peripherally thereon a set of clutch teeth 25 and adjacent to its forward end, the driven shaft has rigidly mounted thereon, a collar 20 provided with a set of peripheral clutch teeth 21.

The portion 30 of the driven shaft between the collar 20 and the flange 24, has a cross section, as shown in Figure 4, or optionally, a modified cross section, as shown in Figure 5. This portion 30 of the driven shaft forms one element of an overrunning clutch mechanism G which comprises in addition to the portion of the driven shaft referred to, a sleeve 31 rotatably and slidably mounted on the driven shaft, and a plurality of cam elements 32.

As shown in Figure 4, that portion 30 of the driven shaft between the collar 20 and the flange 24 is formed with a series of longitudinal grooves 33 separated by an equal number of radial extensions 34. The outer surfaces of the radial extensions 34 are preferably ground to form a cylindrical bearing for the outer sleeve 31, and the longitudinal grooves have formed therein semi-cylindrical depressions 35 to serve as bearings for the cam elements 32. The radial extensions 34 are provided with tangentially extending bores 37 which carry the compression springs 38, the outer ends of which bear against adjacent faces of the cam elements 32.

The outer sleeve member 31 has formed interiorly with in its oposite ends, the sets of clutch teeth 50 and 51, and 52 and 53 for a purpose to be later described. Between the inner sets of clutch teeth 51 and 53, the outer sleeve 31 is formed with a smooth cylindrical surface of such a diameter as to have a bearing fit with the outer surfaces of the radial extensions 34. Exteriorly of the outer sleeve 31 and near one end thereof, is an annular groove 27 to accommodate the shifter fork 26.

The cam elements 32 each have a semi-cylindrical bearing surface, opposite to which is a clutch surface in the form of an involute. Each cam is mounted with the semi-cylindrical bearing surface resting in a semi-cylindrical depression 35 in a groove 33 in the portion 30 of the driven shaft C, and is of such a thickness that the opposite involute surface will bear against the interior surface of the outer sleeve 31. Thrust washers 55 and 55' surround the portion 30 of the driven shaft C and bear against the ends of the cam elements 32. Snap rings 54 and 54' are inserted between the inner ends of the inner sets of clutch teeth 53 and 51 in the sleeve 31 and the thrust washers 55 and 55' respectively, to lock the cam elements in position relative to the sleeve 31 and cause the sleeve and the cam elements, to slide as a unit upon the driven shaft C under control of the shifter fork 26.

From an inspection of Figure 4, it will be seen that the cams are located in the longitudinal grooves 33 in the portion 30 of the driven shaft with a semi-cylindrical bearing surface of each cam element pivotally carried in a semi-cylindrical depression 35 in the circumferential face of each groove 33 and the opposite involute surface bearing against the inner surface of the sleeve 31 and held in contact therewith by a compression spring 38. The cam elements 32 are all mounted in the same relative position whereby the driven shaft C carrying the cam elements may rotate freely within the sleeve 31 in one direction whenever the rotational speed of the driven shaft is greater than the rotational speed of the sleeve. If, however, the rotational speed of the sleeve 31 tends to exceed the rotational speed of the driven shaft C in the same direction, the cam elements 32 will wedge between the sleeve 31 and the driven shaft to cause the clutch mechanism G, comprising the sleeve 31, the cams 32 and the driven shaft C, to rotate as a unit to provide a one-way drive for the vehicle.

Referring to Figure 4, it will be seen that there are nine cam elements arranged about the driven shaft C and operatively engageable with the sleeve 31. Preferably these nine cam elements are arranged in three groups with three adjacent cam elements in each group. The cam elements in each group are preferably formed with different degrees of involution to provide at least one shock angle cam in each group to operate in conjunction with the remaining cams which are formed as load angle cams as fully set forth in copending application by Delmar G. Roos, Serial No. 525,397 filed March 26, 1931.

In the modification shown in Figure 5, the portion 30' of the driven shaft C is formed with longitudinal grooves 33', separated by radial extensions 44', the outer surfaces of which form a bearing upon which is journaled the sleeve 31. Each radial extension 44' is provided with a tangentially directed bore 47, within which is carried one end of a compression spring 48, on the outer end of which is fitted a guide member 49 having a hollow sleeve portion extending into the bore 47 and surrounding the end of the spring 48. The circumferential faces 40 of the grooves 33' are formed as cam surfaces, and, between these cam surfaces 40 and the inner surface of the sleeve 31, and urged into contact with the sleeve 31 by the spring pressed guides 49, are rollers 42 adapted to wedge between the cam surfaces 40 and the sleeve 31, to cause the sleeve 31, rollers 42, and driven shaft C to rotate as a unit whenever the rotational speed of the sleeve 31 tends to exceed the rotational speed of the driven shaft C. In the event that the rotational speed of the driven shaft exceeds the rotational speed of the sleeve 31, the rollers 42 will be rolled back on the cam surfaces 40 against the pressure of springs 48, thereby permitting the driven shaft C to rotate freely in the sleeve 31 in the same direction.

In the form of the invention shown in Figure 5, there are nine cam surfaces and nine rollers associated therewith. In practice, the nine cam surfaces are grouped in three groups with three adjacent rollers in each group. Within each group the cam surfaces are formed as particularly illustrated in Figure 6. This figure comprises a development of the structure and for the sake of convenience the description thereof will be reduced to terms of a representative cross section of the device. The numeral 63 indicates the inner surface of the sleeve member 31. The portion of the surface as here shown is in the form of any arc, the radius of which is empirically determined from practical considerations. Within the arc 63 and in contact therewith, is a circle 64 which represents one of the rollers 42. The radial dimension of the roller is also empirically determined from consideration of the number of rollers, the length of each roller and the distribution of the load upon the rollers, and other pertinent facts.

The numeral 65 indicates a point on the axis of rotation of the sleeve 31 and the driven shaft C, and the numeral 69 indicates a point on the axis of a roller 42, on the same transverse plane. In order to develop the cam surfaces, a section of one of which is indicated by the numeral 70; with the point 69 as a center, an arc is struck through the point 65 and at a point on this arc 9° from the point 65 and on the same side as the wedging portion of the cam, there is established a point 66. About this point 66 an arc is struck, the radius of which is the distance from the axis 66 to the nearest part of the circle 64. A portion of this last named arc, somewhat larger than the diameter of the circle 64, and extending approximately equal distances on either side of the point of contact with the circle 64, forms the section 70 of one of the cam elements 40. The arcs 70' and 70" are spaced 40 and 80° respectively from the arc 70 and are formed in the same manner except that the center points 67 and 68 of the arcs 70' and 70" respectively are spaced a distance of only 6° of arc from the point of rotation 65 on arcs struck through the point 65 with points 69' and 69" as centers.

The cam surface of which the arc 70 is a representative section and which is formed by an arc, the center of which is spaced 9° from the axis 65, is known as the shock angle cam and the roller associated therewith serves to take up the initial shock loads but due to the steep inclination of the cam surface, has a tendency to slip under steady load conditions.

The cam surfaces of which the arcs 70' and 70" are representative sections and which are formed by arcs, the centers 66 and 67 of which are spaced 6° from the point 65, are known as the load angle cams and the rollers associated therewith take up the load upon slippage of the roller associated with the shock angle cam.

It will be noted that the radial load upon the load angle cam is much greater than the radial load upon the shock angle cam, and it is apparent that a heavy shock transmitted directly to the load angle cam would impose such an excessive radial load thereon as either to distort the rollers or the cam surfaces, or cause the roller to bind between the driven shaft and the sleeve.

Owing to the steeper inclination of the shock angle cam, the roller associated therewith will take up a limited radial load before slipping and will not bind between the driven shaft and the sleeve, but at the same time will act in the nature of a buffer to prevent heavy shock loads from being transmitted directly to the rollers associated with the load angle cams.

While the specific combination of nine rollers in three groups of three rollers each and the specific angles of 9° for the shock angle cams and 6° for the load angle cams, has been found to comprise satisfactory results for the specific application illustrated, it is to be understood that the invention is in no way limited to these specific figures. The number of cams and rollers associated therewith, the number of groups into which such cams and rollers are divided, and the number of cams and associated rollers in each group, may be varied in any combination to meet the particular requirements of any specific installation and the angles of the shock angle cams and the load angle cams may be varied between any practical limits to meet the requirements of any practical installation.

The transmission is provided with the usual gear shift lever H and mounted in the upper part of the transmission opposite the lower end of the gear shift lever H, are two stop members 60 and 61.

The operation of this transmission is as follows:

The shift into first speed or reverse speed is accomplished in the usual manner by means of the shifting gear 14 which slides upon the splined portion 13 of the driven shaft C upon actuation of the shifter fork 15, to mesh with the first speed gear 16 or the reverse gear 17. It is thus apparent that the first and reverse speeds are not affected by the overrunning clutch mechanism.

In order to accomplish a shift into second speed, utilizing the overrunning or free wheeling function of the clutch element G, the main clutch of the vehicle and the gear shift lever H are manipulated in the usual manner. This maneuver moves the gear 14 into neutral or non-meshing position and shifts the sleeve 31 rearwardly until the rearward ends of the clutch teeth 50 engage the forward ends of the clutch teeth 23. The power is now transmitted from the drive shaft B through the gear 1 to the gear 7, from the gear 7 through the sleeve F to the gear 12, from the gear 12 to the gear 10 and from thence through the extension 22 to the clutch teeth 23, from the clutch teeth 23 to the inter-meshing clutch teeth 50 and so through the sleeve 31 and the cam members 32 to the driven shaft C.

In this position of the parts, if the speed of the driven shaft C exceeds the speed of the drive shaft B, the driving connection between the sleeve 31 and the driven shaft C will be released by the camming action of the cam members 32, and the driven shaft C will be permitted to rotate freely relative to the sleeve 31 which remains connected with the drive shaft B through the intermediate gears.

If it is desired to lock out or omit the overrunning or free wheeling function of the clutch G, an extension, not shown, on the lower end of the gear shift lever H is depressed below the inner end of the stop member 60, thereby permitting an overshift which moves the sleeve member 31 into the position shown in Figure 2. In this position the clutch teeth 50 of the sleeve member intermesh with the clutch teeth 23 on the extension 22 of the gear 10 and the clutch teeth 51 on the sleeve member 31 inter-mesh with the clutch teeth 25 on the annular flange 24 integral with the driven shaft C. In this position the power is transmitted from the drive shaft B through the gears 1 and 7, the sleeve F, the gears 12 and 10, the clutch teeth 23, clutch teeth 50 to the clutch teeth 51 and from thence to the clutch teeth 25, thereby forming a positive driving connection between the gear 10 and the driven shaft C.

To place the parts in position for third speed drive, utilizing the overrunning or free wheeling function of the clutch element G, the shift lever H may be brought into the proper position without manipulation of the main clutch of the vehicle. This will move the sleeve member 31 and the cam members 32 into such a position that the forward ends of the clutch teeth 52 engage the rearward ends of the clutch teeth 9 formed upon the gear 1. In this position the power will be transmitted from the drive shaft B through the gear 1, to the clutch teeth 9, from thence through the clutch teeth 52 to the sleeve member 31 and from the sleeve member 31 through the cam members 32 to the driven shaft C. By reason of the camming action of the members 32, the sleeve 31 cannot turn relatively to the driven shaft C as long as power is being transmitted from the drive shaft B to the driven shaft C, but if for any reason the speed of the driven shaft C exceeds the speed of the drive shaft B, the driving connection between the sleeve 31 and the driven shaft C will be released and the driven shaft C will be permitted to rotate freely in relation to the sleeve member 31.

If it is desired to lock out or eliminate the free wheeling or overrunning function of the clutch element G in third or direct drive speed, an extension on the lower end of the gear shift lever H is depressed below the inner end of the stop member 61, thereby permitting an over-shift of the shift lever which will bring the member 31 to the position shown in Figure 3. In this position, the clutch teeth 52 will inter-mesh with the clutch teeth 9 and the clutch teeth 53 will inter-mesh with the clutch teeth 21 formed on the collar 20 rigidly secured to the driven shaft C. The power will now be transmitted from the drive shaft B to the gear 1 and clutch teeth 9, to the clutch teeth 52 and from thence, to the clutch teeth 53, to the inter-meshing clutch teeth 21 and through the collar 20 to the driven shaft C, thereby providing a positive driving connection between the gear 1 and the driven shaft C.

It is now believed that the detailed features of construction and modes of operation of the two different forms of transmission will be clearly understood by those skilled in the art.

It is to be understood that the forms of this invention herewith shown and described, are illustrative only and are to be taken as examples of the same and formal changes and changes in the shape, size and arrangement of parts may be resorted to without departing from the spirit of the invention and the scope of the sub-joined claims.

What I claim is:

1. In a vehicle transmission mechanism, a drive shaft, a driven shaft, and means to operatively connect said drive shaft to said driven shaft to provide a one-way drive for the vehicle, said means comprising, a sleeve rotatably mounted upon said driven shaft and operatively engageable with said drive shaft, and cam elements slidably carried directly upon said driven shaft and adapted to wedge between said sleeve and said driven shaft to provide a one-way driving connection between said shafts.

2. In a vehicle transmission mechanism, a drive shaft, a driven shaft, and means to operatively connect said drive shaft to said driven shaft to provide a one-way drive for the vehicle, said means comprising, a sleeve rotatably and slidably mounted upon said driven shaft and operatively engageable with said drive shaft, and a plurality of cam elements slidably carried directly upon said driven shaft and engageable with said sleeve to wedge between said sleeve and said driven shaft to provide a one-way driving connection between said shafts.

3. In a vehicle transmission mechanism, a pair of aligned shafts, and means to operatively connect said shafts to provide a one-way drive for the vehicle, said means comprising, a sleeve rotatably mounted upon one of said shafts and operatively engageable with the other of said shafts, and cam elements pivotally and slidably carried directly upon said one shaft and engageable with said sleeve to wedge between said sleeve and said shaft to provide a one-way driving connection between said shafts, and spring means between said one shaft and said cam means to urge said cam means into engagement with said sleeve.

4. In a vehicle transmission mechanism, a drive shaft, a driven shaft, and means to operatively connect said drive shaft to said driven shaft to provide a one-way drive for the vehicle, said means comprising, a sleeve rotatably mounted upon said driven shaft and operatively engageable with said drive shaft, cam means carried directly by said driven shaft and engageable with said sleeve, and spring means carried by said driven shaft urging said cam means into engagement with said sleeve whereby said cam means will wedge between said sleeve and said driven shaft to provide a one-way driving connection between said shafts, and means to selectively provide a two-way drive between said shafts.

5. In a vehicle transmission mechanism, a pair of aligned shafts, and means to operatively connect said shafts to selectively provide a one-way or a two-way drive for the vehicle, said means comprising, an axially movable sleeve rotatably mounted upon one of said shafts and operatively engageable with the other of said shafts, and cam means slidably carried directly upon said one shaft, adapted to wedge between said sleeve and said one shaft to provide a one-way driving connection between said shafts, said sleeve being operatively engageable upon further axial movement thereof with said one shaft to provide a two-way driving connection between said shafts.

6. In a vehicle transmission mechanism, a drive shaft, a driven shaft, an axially movable sleeve rotatably mounted upon said driven shaft, a one-way acting cam means between said sleeve and said driven shaft axially movable with said sleeve, a set of clutch teeth on said drive shaft, a set of clutch teeth on said driven shaft, a plurality of sets of clutch teeth in said sleeve, one set of clutch teeth in said sleeve being engageable upon axial movement of said sleeve with the set of clutch teeth on said drive shaft to provide a one-way drive between said drive shaft and said driven shaft, the other set of clutch teeth within said sleeve being engageable upon further axial movement of said sleeve with the set of clutch teeth on said driven shaft to provide a two-way drive between said drive shaft and said driven shaft.

7. In a vehicle transmission mechanism, a pair of aligned shafts, clutch teeth formed on each of said shafts, an axially movable sleeve rotatably mounted upon one of said shafts, one-way acting cam means between said sleeve and said one shaft, clutch teeth within said sleeve engageable with the clutch teeth upon the other of said shafts or with the clutch teeth upon both of said shafts to provide respectively a one-way or a two-way drive between said shafts.

8. In a vehicle transmission mechanism, a drive shaft, a driven shaft, an axially movable sleeve rotatably mounted upon said driven shaft, cam elements slidably carried directly by said driven shaft axially movable thereon upon axial movement of said sleeve and engageable with said sleeve to provide a one-way driving connection between said sleeve and said driven shaft, thrust washers bearing against the ends of said cam members, and snap rings bearing against said thrust washers and engageable with said sleeve to maintain said cam means in radial alignment with said sleeve.

9. In a vehicle transmission mechanism, a pair of aligned shafts, one of said shafts having a portion thereof formed with longitudinal grooves separated by radial extensions, a sleeve rotatably mounted upon said radial extensions, and cam members axially slidable and rockable in said grooves adapted to wedge between said shaft and said sleeve to provide a one-way drive therebetween and to remain in radial alignment with said sleeve.

10. In a vehicle transmission mechanism, a drive shaft, a driven shaft, a portion of said driven shaft being formed with longitudinal grooves separated by radial extensions, a sleeve rotatably mounted upon said radial extensions and axially movable to operatively engage said drive shaft, a cam element carried in each of said longitudinal grooves in said driven shaft adapted to wedge between said driven shaft and said sleeve to provide a one-way drive between said shafts, said grooves being longer than said cam elements whereby said cam elements may slide axially relative to said driven shaft to follow the axial movements of said sleeve.

11. In a vehicle transmission mechanism, a drive shaft, a driven shaft, a portion of said driven shaft being formed with longitudinal grooves separated by radial extensions, each of said grooves having a semi-cylindrical depression formed in the circumferential surface thereof, a sleeve rotatably and slidably mounted upon said radial extensions, and cam elements carried in said longitudinal grooves, each cam element having a semi-cylindrical bearing surface pivotally supported in one of said semi-cylindrical depressions in said driven shaft and an involute wedging surface engageable with said sleeve, and spring members carried between said radial extensions and said cam elements to maintain said cam elements in contact with said sleeve, whereby said cam elements will wedge between said driven shaft and said sleeve in one direction to provide a one-way driving connection between said sleeve and said driven shaft, and means for restraining said cam elements from axial movement relative to said sleeve.

12. In a vehicle transmission mechanism, a pair of aligned shafts, a sleeve rotatably mounted upon one of said shafts and axially slidable to engage with the other of said shafts, said one shaft being formed with cam surfaces directly thereon, and rollers mounted between said cam surfaces and said sleeve to wedge between said sleeve and said one shaft to provide a one-way drive between said shafts.

13. In a vehicle transmission mechanism, a drive shaft, a driven shaft, cam-shaped grooves formed in said driven shaft, a sleeve mounted upon said driven shaft surrounding said grooves and engageable with said drive shaft, and rollers mounted in said cam-shaped grooves to wedge between the cam surfaces of said grooves and said sleeve to provide a one-way driving connection between said shafts, said rollers being axially slidable upon said driven shaft to permit axial movement of said sleeve to engage said drive shaft.

14. In a vehicle transmission mechanism, a drive shaft, a driven shaft, said driven shaft being formed with cam-shaped grooves therein, a sleeve rotatably mounted upon said driven shaft surrounding said grooves axially movable to engage with said drive shaft, rollers mounted in said grooves and engageable with said sleeve, and spring pressed guides carried by said driven shaft urging said rollers into engagement with said sleeve to wedge between said sleeve and the cam surfaces of said grooves to provide a one-way driving connection between said shafts, said grooves being longer than said rollers to permit said rollers to slide upon said driven shaft to follow the axial movements of said sleeve.

15. In a vehicle transmission mechanism a pair of aligned shafts, one of said shafts having longitudinal grooves formed in a portion thereof, the circumferential surfaces of said grooves being formed as cam surfaces, a sleeve rotatably mounted upon said shaft surrounding said grooves, rollers carried by said one shaft between said cam surfaces and said sleeve and engageable with said sleeve to provide a one-way driving connection between said sleeve and said shaft, said cam surfaces being formed with different degrees of inclination to provide shock angle cams and load angle cams in said one-way driving connection.

16. In a vehicle transmission mechanism, a pair of aligned shafts, one of said shafts having longitudinal grooves formed in a portion thereof, the circumferential surfaces of said grooves being formed as cam surfaces, a sleeve rotatably mounted upon said shaft surrounding said grooves, rollers carried by said one shaft between said cam surfaces and said sleeve and engageable with said sleeve to wedge between said cam surfaces and said sleeve to provide a one-way driving connection between said sleeve and said shaft, said grooves being grouped in three or more groups having an equal number of grooves in each group, the angle of inclination of the cam surfaces of the grooves varying in each group to provide shock angle cams and load angle cams in each group.

17. In a vehicle transmission mechanism, a pair of aligned shafts, one of said shafts having longitudinal grooves formed in a portion thereof, the circumferential faces of said grooves being formed as cam surfaces, a sleeve rotatably mounted upon said shaft surrounding said grooves, and rollers carried by said one shaft between said cam surfaces and said sleeve, each of said cam surfaces being formed by rotating about an axis offset from the axis of the driven shaft a line parallel to said axis, said offset axis being located on an arc struck through the axis of said driven shaft with the axis of said roller as a center and the distance between the axis of said driven shaft and said offset axis being varied to provide cam surfaces having different angles of inclination.

18. In a vehicle transmission mechanism, aligned drive and driven shafts, grooves in said driven shaft, a sleeve mounted on said driven shaft surrounding said grooves movable into engagement with said drive shaft to provide a one-way drive and further movable into engagement with said driven shaft to provide a two-way drive, and a plurality of substantially equally spaced elements mounted in said grooves between said driven shaft and said sleeve adapted to wedge between said driven shaft and said sleeve to form the one-way driving connection between said sleeve and said driven shaft.

GUY M. HARTSOCK.